United States Patent [19]

Uitenbroek et al.

[11] 4,261,455
[45] Apr. 14, 1981

[54] CENTRIFUGAL PRESSURE RELIEF VALVE FOR A HYDRAULIC CLUTCH

[75] Inventors: Steven C. Uitenbroek, Milwaukee; Glen N. Laubenstein, Random Lake, both of Wis.

[73] Assignee: Allis-Chalmers Corporation, Milwaukee, Wis.

[21] Appl. No.: 972,875

[22] Filed: Dec. 26, 1978

[51] Int. Cl.³ .............................................. F16D 3/14
[52] U.S. Cl. ................................................... 192/106 F
[58] Field of Search .......................... 192/106 F, 85

[56] References Cited

U.S. PATENT DOCUMENTS

| | | | |
|---|---|---|---|
| 2,670,828 | 3/1954 | McFarland | 192/106 F X |
| 3,217,851 | 11/1965 | Mogk | 192/106 F X |
| 3,362,481 | 1/1968 | Steinhagen | 192/106 F X |
| 3,472,350 | 10/1969 | Overson | 192/106 F X |
| 3,537,557 | 11/1970 | Olson | 192/106 F |
| 3,974,743 | 8/1976 | Ivey | 192/106 F X |

*Primary Examiner*—Nile C. Byers, Jr.
*Attorney, Agent, or Firm*—Arthur L. Nelson

[57] ABSTRACT

A relieve valve in a hydraulically operated clutch for the residual pressure caused by centrifugal force on the hydraulic fluid tending to produce limited engagement of the clutch.

10 Claims, 7 Drawing Figures

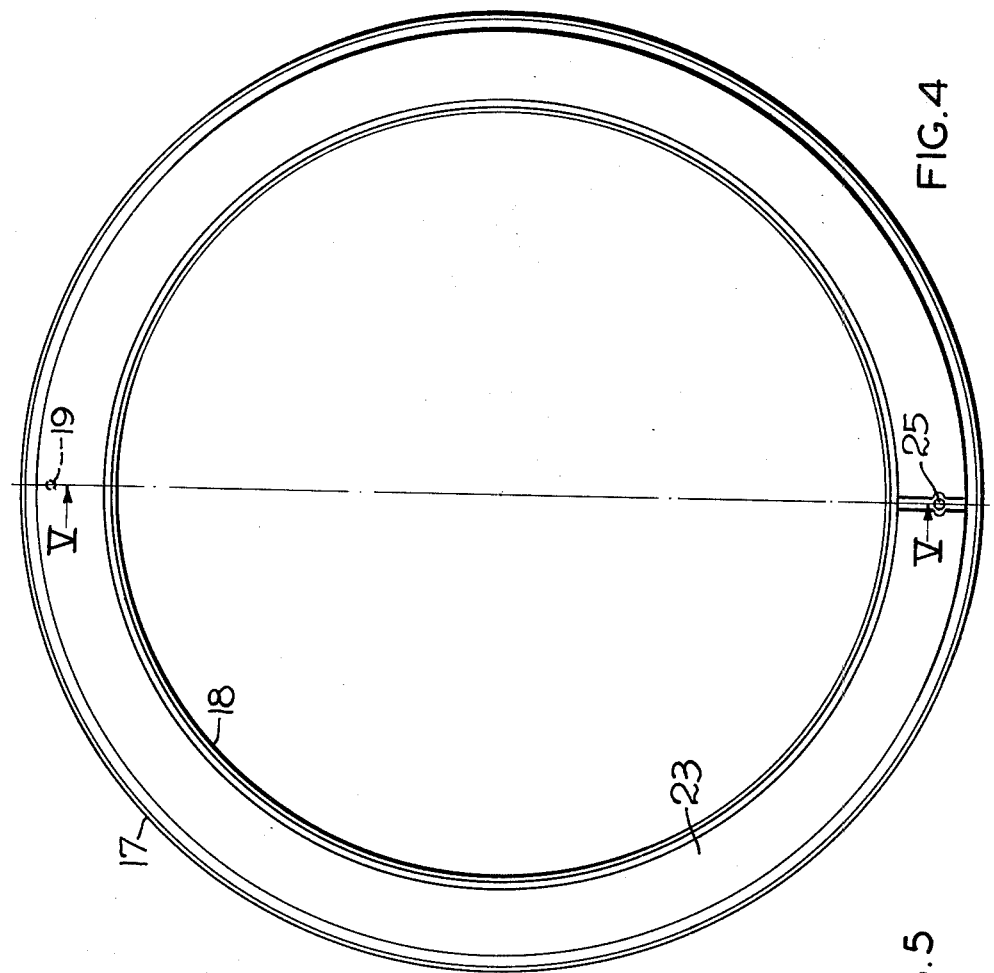
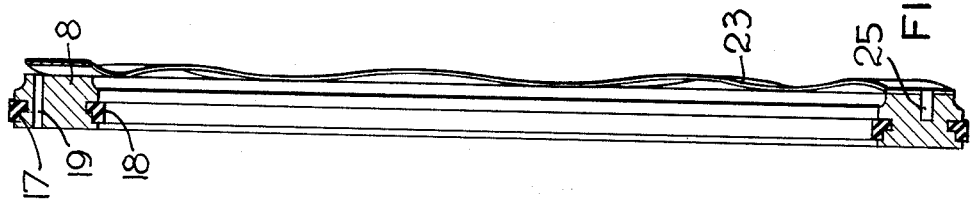

CENTRIFUGAL PRESSURE RELIEF VALVE FOR A HYDRAULIC CLUTCH

This invention relates to a hydraulic clutch and more particularly to a hydraulically operated clutch wherein the centrifugal forces on the hydraulic fluid cause a residual pressure tending to retain partial engagement of the hydraulic clutch. A relief valve is provided to relieve the residual pressure when the clutch is disengaged by interrupting the communication between the source of pressurized fluid and the hydraulic actuator for the clutch.

A hydraulic clutch rotating about an axis contains hydraulic fluid which is subjected to centrifugal forces. The forces depend upon the speed of rotation of the clutch. Normally, a source of pressurized fluid is connected to the hydraulic clutch through a control valve which selectively applies pressurized fluid to the pressurizing chamber of the hydraulic actuator or interrupts communication to the source of pressurized fluid and vents the pressurizing chamber to sump. Even though the pressurizing chamber is vented to sump, the fluid remaining within the chamber is subjected to centrifugal forces due to the rotation of the clutch which may produce a partial engagement or dragging of the clutch disks.

Accordingly, a relief valve is provided to vent the pressurizing chamber to avoid the residual pressure in the hydraulic actuator. Conventional relief valves are positioned where they are often difficult to machine and to provide accurate tolerances during manufacture. Conventional valves are vulnerable to contamination and subject to the centrifugal forces and speed of rotation of the clutch. Accordingly, this invention provides a relief valve which has none of these undesirable features and is formed by a return spring which allows an orifice from the pressurizing chamber to the chamber containing the clutch pack to open when the clutch is disengaged. The orifice is closed when the hydraulic actuator engages the vehicle clutch. The return spring is of sufficient magnitude to return the piston to its normally retracted position when communication between the source of pressurized fluid and the pressurizing chamber is interrupted. The return spring is sufficiently large to return the piston and open the orifice allowing venting fluid and releasing the residual pressure due to centrifugal forces on the hydraulic fluid. Accordingly, the return spring provides a clearance between the return spring and the piston when the clutch is disengaged.

It is an object of this invention to provide a relief valve for the hydraulic actuator of a hydraulic clutch to relieve the residual pressure caused by centrifugal forces on the hydraulic fluid when the clutch is rotating.

It is another object of this invention to provide a pressure relief valve in the hydraulic actuator of a clutch to relieve residual pressure in the hydraulic actuator caused by centrifugal forces on the fluid in the actuator.

It is a further object of this invention to provide a relief valve in a hydraulic clutch formed by the return spring and the hydraulic piston to relieve pressure from the hydraulic actuator when the clutch is disengaged.

It is a further object of this invention to provide a relief valve formed by the return spring and the piston of a hydraulic cylinder of a hydraulic clutch to relieve residual pressure in the hydraulic clutch caused by centrifugal forces due to the rotational movement of the clutch when the clutch is disengaged.

The objects of this invention are accomplished in an annular hydraulic clutch which is suitably connected to a source of pressurized fluid through a control valve for actuating and releasing of the clutch. The residual pressure in the hydraulic actuator due to centrifugal forces on the hydraulic fluid are released through a relief valve formed by the return spring and the piston in the hydraulic actuator. The spring covers an orifice in the piston of the hydraulic actuator when the clutch is engaged and permits the buildup of pressure in the pressurizing chamber of the hydraulic actuator to engage the clutch. When the clutch is released, the return spring returns the piston to the retracted position due to the spring force which is sufficient to overcome any residual pressure due to centrifugal force on the hydraulic fluid due to the rotation of the clutch allowing the hydraulic fluid to flow through the orifice and return the piston for complete disengagement of the clutch. The return spring can be a wave spring or a bellville spring or any suitable spring which engages the orifice to close it when the clutch is engaged and allows clearance between the spring and the piston for uncovering the orifice allowing the orifice to vent the pressurizing chamber when the clutch is released.

The preferred embodiment of this invention is illustrated in the attached drawings.

FIG. 1 includes a schematic diagram showing a hydraulic clutch actuating system and a partial cross section of the hydraulic clutch shown in the disengaged position.

FIG. 2 includes a schematic diagram of the hydraulic clutch actuating system and a partial cross section view of the hydraulic clutch in the engaged position.

FIG. 4 is a partial section view of the hydraulic piston for use in the hydraulic actuator of the clutch.

FIG. 5 is a cross section view of the hydraulic piston taken on line V—V of FIG. 4 showing the hydraulic piston and the wave spring operating as a return spring for the clutch.

Figure 6:
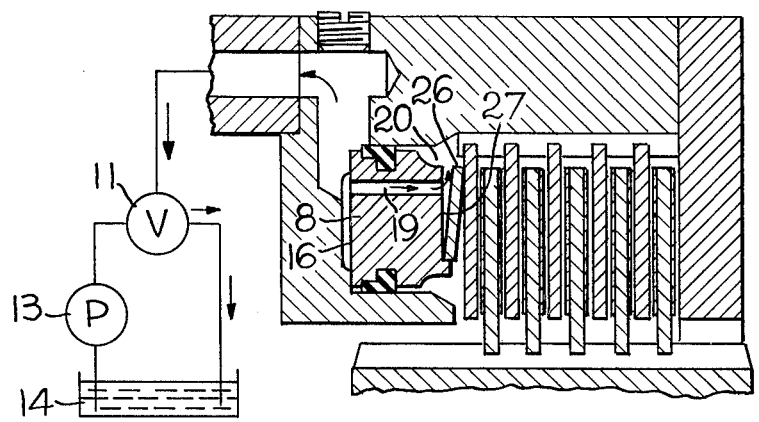

FIG. 6 includes a schematic diagram and a partial cross section view of the hydraulic clutch using a bellville spring as a return spring with the clutch in the disengaged position.

Figure 7:
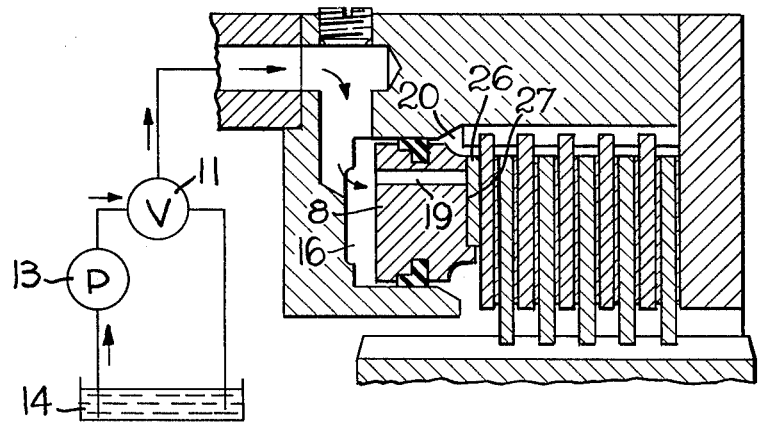

FIG. 7 includes a schematic diagram of the hydraulic clutch actuating circuit and a partial cross section view of the hydraulic clutch using a bellville spring as a return spring and the clutch in the engaged position.

Figure 1:
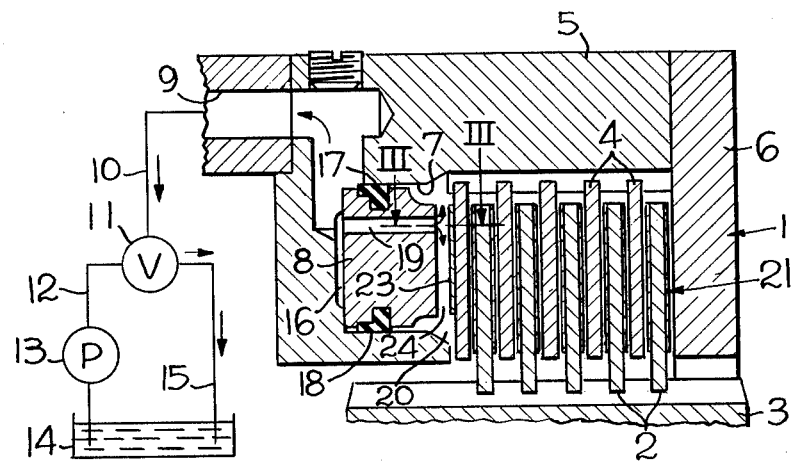

Referring to FIG. 1, the hydraulic clutch 1 includes the clutch disks 2 mounted on the clutch hub 3. The clutch disks 4 are mounted on the clutch drum 5 which carries the reaction plate 6. The clutch drum 5 forms the hydraulic cylinder 7 which receives the hydraulic piston 8. The passage 9 is in communication with the conduit 10. Conduit 10 leads through the clutch control valve 11 which receives pressurized fluid from the pump discharge conduit 12. Pump 13 receives fluid from the sump 14. Return conduit 15 is connected between the clutch control valve 11 and the sump 14. The control valve is provided with a valve element which selectively provides communication between the pump 13 and the clutch 1 for clutch engagement, or the clutch 1 and sump 14 when the clutch is disengaged.

The pressurizing chamber 16 is formed by the hydraulic piston 8 and the hydraulic cylinder 7. The piston 8 is provided with an annular seal 17 on the outer periphery of the annular piston as well as the seal 18 on its inner periphery. The orifice 19 provides communication between the pressurizing chamber 16 and the chamber 20 receiving the clutch pack 21. A wave spring 23 is shown biasing the piston 8 to its retracted position. The wave spring 23 is shwon in the compressed position between the left hand of the clutch disks 4 as the clutch pack is compressed between the piston 8 and the reaction plate 6.

Figure 2:
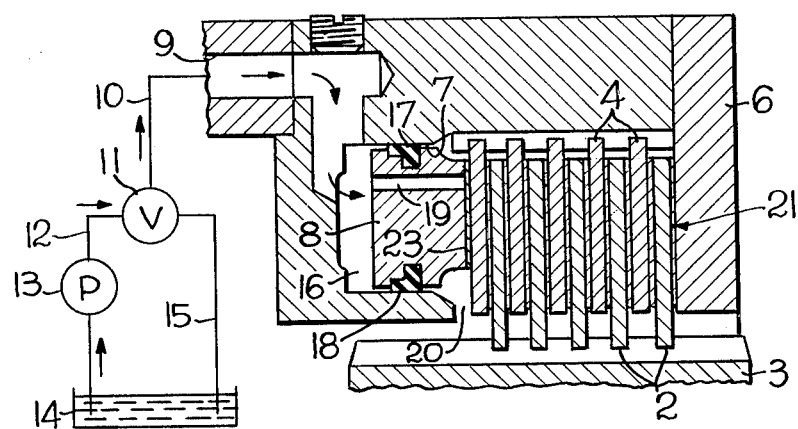
Figure 3:
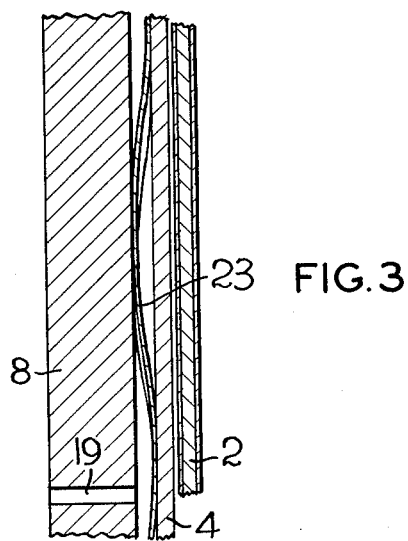
FIG. 3 is a cross section view taken on line III—III of FIG. 1 showing the wave spring used as a return spring for the clutch.

The wave spring 23 closes the orifice 19 as shown in FIG. 2 when the clutch is engaged. The wave spring 23 biases the piston 8 to its retracted position and provides clearance 24 between the wave spring 23 and the orifice 19. FIG. 3 also shows the wave spring as it retracts the piston 8 to its retracted position.

Since the wave spring forms the wave configuration in which it alternately engages piston 8 and the clutch disks 4 in the clutch pack chamber 20, an aligning pin 25 must be provided to assure that there is clearance 24 between the wave spring and the piston when the piston is in the retracted position. The pin 25 as shown in FIGS. 4 and 5 is positioned between the ends of the wave spring to prevent it from rotating within the clutch pack chamber and causing a continual closing of the orifice in certain positions of the spring relative to the piston. The pin assures that there will be clearance between the wave spring and the piston when the clutch is in the retracted and disengaged position.

FIGS. 6 and 7 show a modification wherein a bellville washer 26 is used as a retracting spring to retract the piston 8 to its normally retracted position when the clutch is disengaged. Bellville spring 26 is shown in the position closing the orifice 19 when the hydraulic actuator is actuated and the clutch is engaged. Clearance is normally provided between the outer peripheral edge of the bellville spring 26 and the orifice 19 when the clutch is disengaged in FIG. 6. Since the radial facing 27 on the piston 8 is a flat surface, when the clutch is engaged as shown in FIG. 7, the radial facing 27 engages the flat side surface of the bellville spring 26 and closes the orifice.

Operation of the device will be described in the following paragraphs.

Referring to FIGS. 1 and 3, the hydraulic clutch is shown in the disengaged position. With the hydraulic clutch in the disengaged position, the wave spring expands to the position as shown in FIGS. 1 and 3 in which the orifice allows fluid to flow from the pressurizing chamber 16 to the clutch pack chamber 20. Since the hydraulic fluid in the pressurizing chamber is subjected to centrifugal force, the wave spring must be sufficiently strong to expand and cause the piston 8 to retract away from the clutch pack. Once the clearance is provided between the wave spring 23 and the piston 8, fluid is vented from the pressurizing chamber 16 to the clutch pack chamber and the piston 8 can fully retract as shown in FIG. 1.

When the hydraulic clutch is actuated, the pressurized fluid from the pump 13 is allowed to flow through the valve 11 into the pressurizing chamber 16. With the pressurized fluid in pressurizing chamber 16, the orifice retards the escape of fluid flow out of the pressurizing chamber and causes the piston to compress the clutch disk pack. This movement of the piston also compresses the wave spring 23 to a position as shown in which the orifice is fully closed and the clutch is fully engaged.

The operation of the modification shown in FIGS. 6 and 7 is essentially the same as that for the embodiment shown in FIGS. 1, 2, 3, 4 and 5. The bellville spring 26 is shown with a clearance between the bellville spring and the orifice 19. Pressurized fluid from the pump 13 is allowed to flow into the pressurizing chamber 16, the piston 8 moves to the right to compress the bellville spring 26 and eventually closes the orifice 19 when the clutch is fully engaged as shown in FIG. 7. When the clutch is disengaged, the bellville spring 26 moves the piston 8 in a left hand direction and causes the orifice to uncover allowing venting of fluid through the orifice to the clutch disk pack chamber 20. When the clutch is released, the control valve 11 vents pressurized fluid from the pressurizing chamber 16 to sump 14. Also, the orifice 19 allows venting of pressurized fluid from the residual pressure of the pressurizing chamber 16 to the clutch pack chamber 20.

The embodiments of the invention in which an exclusive property or privilege is claimed are defined as follows:

1. A hydraulic clutch having a relief valve for relieving fluid pressure from a hydraulic actuator comprising, a hydraulic clutch including clutch disks and a hydraulic actuator defining a pressure chamber rotating about an axis, a hydraulic piston reciprocating in said hydraulic actuator responsive to pressure in said pressure chamber for engaging said clutch, a return spring compressively positioned between said piston and one of said clutch disks for returning said piston to the retracted position when said clutch is disengaged, orifice means in said piston for relieving fluid pressure from said pressure chamber, a valve formed by said return spring and said piston including a surface surrounding said orifice means forming a valve seat, a deformable mating surface on said spring forming a valve element for closing the orifice when said clutch is actuated and opening the orifice to relieve pressure in said hydraulic actuator when said clutch is disengaged.

2. A hydraulic clutch having a relief valve for relieving fluid pressure from a hydraulic actuator as set forth in claim 1 wherein said return spring defines a wave spring.

3. A hydraulic clutch having a relief valve for relieving fluid pressure from a hydraulic actuator as set forth in claim 1 wherein said return spring defines a bellville spring.

4. A hydraulic clutch having a relief valve for relieving fluid pressure from a hydraulic actuator as set forth in claim 1 wherein said return spring defines a wave spring, an alignment pin to angularly align the clearance between said wave spring and said orifice for opening said orifice when said piston is in the retracted position.

5. A hydraulic clutch having a relief valve for relieving fluid pressure from a hydraulic actuator as set forth in claim 1 including clutch disks, said orifice means defining a disk chamber receiving said clutch disks, communication between said pressure chamber and said disk chamber.

6. A hydraulic clutch having a relief valve for relieving fluid pressure from a hydraulic actuator as set forth in claim 1 wherein said piston defines a radial surface on the forward end of said piston, said return spring defines a mating surface for closing said orifice when said clutch is engaged.

7. A hydraulic clutch having a relief valve for relieving fluid pressure from a hydraulic actuator as set forth in claim 1 including, clutch disks, means positioning said return spring between said clutch disks and said piston for covering said orifice when said clutch is engaged and providing clearance between said return spring and said orifice when said clutch is disengaged.

8. A hydraulic clutch having a relief valve for relieving fluid pressure from a hydraulic actuator as set forth in claim 1 wherein said piston defines a planar surface, a mating surface on said return spring for closing said orifice when said hydraulic clutch is actuated.

9. A hydraulic clutch having a relief valve for relieving fluid pressure from a hydraulic actuator as set forth in claim 1 wherein said piston defines a surface for engaging said spring, said spring defining a mating surface around the periphery of said orifice for closing said orifice when said hydraulic clutch is actuated, said return spring defining a clearance between said piston and said spring when said clutch is disengaged.

10. A hydraulic clutch having a relief valve for relieving fluid pressure from a hydraulic actuator as set forth in claim 1 wherein said piston defines a surface engaging said spring, said spring selectively engaging said surface at said piston around said orifice when said clutch is disengaged.

* * * * *